United States Patent
Bergström et al.

(10) Patent No.: US 8,085,697 B2
(45) Date of Patent: Dec. 27, 2011

(54) METHOD AND ARRANGEMENT IN REAL-TIME DATA BI-CASTING MOBILE SYSTEM

(75) Inventors: Karl Olof Joakim Bergström, Stockholm (SE); Per Beming, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 765 days.

(21) Appl. No.: 11/913,462

(22) PCT Filed: May 2, 2006

(86) PCT No.: PCT/SE2006/050092
§ 371 (c)(1),
(2), (4) Date: Nov. 2, 2007

(87) PCT Pub. No.: WO2006/118540
PCT Pub. Date: Nov. 9, 2006

(65) Prior Publication Data
US 2008/0192662 A1    Aug. 14, 2008

(30) Foreign Application Priority Data

May 4, 2005    (SE) ..................................... 0501056

(51) Int. Cl.
*H04B 7/00* (2006.01)
(52) U.S. Cl. ......... 370/310; 370/394; 370/331; 370/349
(58) Field of Classification Search .................. 370/310, 370/331, 338, 349, 394
See application file for complete search history.

(56) References Cited

U.S. PATENT DOCUMENTS

| | | | |
|---|---|---|---|
| 5,278,892 A * | 1/1994 | Bolliger et al. | 455/442 |
| 6,466,556 B1 * | 10/2002 | Boudreaux | 370/331 |
| 2002/0045450 A1 * | 4/2002 | Shimizu et al. | 455/442 |
| 2003/0147371 A1 * | 8/2003 | Choi et al. | 370/341 |
| 2003/0223422 A1 * | 12/2003 | Igarashi et al. | 370/390 |
| 2004/0062248 A1 * | 4/2004 | Nagarajan et al. | 370/394 |
| 2004/0071108 A1 * | 4/2004 | Wigell et al. | 370/328 |
| 2004/0184424 A1 | 9/2004 | Shibata et al. | |
| 2005/0232198 A1 * | 10/2005 | McCann et al. | 370/331 |
| 2005/0265284 A1 * | 12/2005 | Hsu et al. | 370/331 |
| 2006/0034175 A1 * | 2/2006 | Herrmann | 370/236 |
| 2006/0036821 A1 * | 2/2006 | Frey et al. | 711/162 |

* cited by examiner

*Primary Examiner* — Ricky Ngo
*Assistant Examiner* — Rasheed Gidado

(57) ABSTRACT

An object of the present invention is to provide an improved real-time application performance for user equipments. The object is achieved by a method for bi-casting real time data packets in a mobile system node. The node is comprised in a mobile system, which mobile system comprises an old Node-B and a new Node-B. The old Node-B and the new Node-B are adapted to be connected to the node. The mobile system further comprising a user equipment 130 adapted for switching the receipt of real time data packets from the old Node-B to the new Node-B. The method comprises the steps of associating a first sequence number with a first real time data packet adapted to be sent to the old Node-B, and associating a second sequence number with the same first real time data packet adapted to be sent to the new Node-B. The second sequence number is different from the first sequence number.

8 Claims, 2 Drawing Sheets

METHOD AND ARRANGEMENT IN REAL-TIME DATA BI-CASTING MOBILE SYSTEM

TECHNICAL FIELD

The present invention relates to a method and an arrangement in a mobile system node. More specifically it relates to a mechanism for bi-casting.

BACKGROUND OF THE INVENTION

In 3rd Generation Partnership Project (3GPP) Release 5, the Wideband Code Division Multiple Access (WCDMA) standard was extended with High Speed Downlink Shared Channel (HS-DSCH) (also know as, High speed downlink packet access HSDPA), where radio resource allocation was also located in the Node-B. The Node-B is the function within the Universal Mobile Telephone System (UMTS) network that provides the physical radio link between a user equipment and a mobile system network. Along with the transmission and reception of data across the radio interface the Node-B also applies the codes that are necessary to describe channels in a Code Division Multiple Access (CDMA) system. Other HS-DSCH functions that were introduced in the Node-B except radio dependent scheduling were Hybrid Automatic Repeat Request (H-ARQ) and fast re-transmissions. The HS-DSCH channel targets transmission of Internet Protocol (IP) type services and several user equipments, share a common physical resource on the radio interface. Even though the main design principles for HS-DSCH were not aiming for support of voice or other real-time application services, the physical layer radio properties of the HS-DSCH have been proven also very much suited to cater for, real-time application services such as e.g., Voice over IP (VoIP) traffic services.

In 3GPP Release 99, mobility is handled by the Radio Network Controller (RNC) with assistance from the user equipment. The user equipment sends a measurement report indicating which cells (or Node-Bs) that have good radio channel as measured on a pilot signal. The RNC receives this measurement report, establish the appropriate radio channels in the concerned Node-Bs, and indicate to the user equipment that it should switch the reception to these new radio channels. Also in 3GPP Release 99, the user equipment can do simultaneous reception from several cells at the same time (macro-diversity). This gives an interrupt free transition when the user equipment moves from one cell to another within the mobile system, without any break in the communication. However, macro diversity is not possible when using HS-DSCH. For HS-DSCH the user equipment instead leaves the old radio channel before it re-establishes the connection via a new radio channel in the new cell. The switching time from the old cell to the new cell could lead to an interruption in the reception and data flow.

Data packets to be transferred to the user equipment are sent in a stream from the RNC to Node-B where the data packets are temporary stored in e.g. a buffer, while waiting to be scheduled. When the RNC decides that the user equipment shall change cell, the RNC need to send data packets in another stream to the new Node-B. Although the RNC commands the user equipment to change cell, the RNC cannot know exactly which data packets were sent to the user equipment before the user equipment leave the old cell, and can therefore not know exactly from where in the packet data stream it should start to transmit in the new cell. Thus the RNC cannot know from where it should start send the data to the new Node-B instead of the old. If the RNC sends data too early to the new node B, the interruption time will be longer than necessary, and if the RNC sends the data too late, packets will be unnecessarily dropped.

In order to make sure that the interruption is as short as possible and that no packets are unnecessarily dropped the RNC can make sure that the buffers in the Node-B have user data to transmit to the user equipment all the time. To cater for these facts it is the state of the art in other technologies to perform bi-casting and send the same user data packets to both the new and the old Node-B in parallel during a short transition phase while the handover is taking place.

When real time user data such as e.g. VoIP is transferred, the user data stream have data packets, so-called Protocol Data Units (PDUs) arriving on a regular basis from the application, e.g. once every 20 ms. For real-time applications the application requires to have the PDUs in sequence and within a certain time period, otherwise they are not useful. Therefore one can have a "time-to-live" timer running in all buffers, and if the data get too old it is discarded, even before it is sent. For HS-DSCH there is such a function included in the Node-B. Also, since it is a real time service, there is no need or possibility to involve Radio Link Control (RLC) re-transmissions by operate RLC in Acknowledged Mode (AM), so RLC is operated in either Unacknowledged Mode (UM) or Transport Mode (TM). When using HS-DSCH only RLC UM is applicable. RLC UM adds its own sequence number so that one can detect if there were PDUs lost on the radio interface. In the case of doing RLC UM on HS-DSCH sequence number checking is done in the user equipment.

When using RLC UM for a real time service, the application PDUs are encapsulated in RLC UM PDUs using segmentation/concatenation and addition of a sequence number. E.g.:
A RLC PDU1 is associated with a sequence number SN5, (PDU1-SN5)
a RLC PDU2 is associated with a sequence number SN6, (PDU2-SN6)
a RLC PDU3 is associated with a sequence number SN7, (PDU3-SN7)
a RLC PDU4 associated with a sequence number SN8, (PDU4-SN8) etc., and generally
a RLC PDUN is associated with a sequence number SNx (of course N may be equal to x).

In case of mobility from an old Node-B to a new Node-B the current handling in the RLC UM receiver within the user equipment may lead to long interruptions in the data flow. This can be illustrated by the following scenario. A user equipment moves from an old cell to a new cell while a stream of three RLC UM PDUs are to be sent from the Core network (CN), via the RNC to a user equipment. Bi-casting is used to limit the interruption and the RNC estimates that the change would occur around when PDU1-SN5, PDU2-SN6, PDU3-SN7 are sent, so PDUs 1-3 are sent both to the old Node-B and new Node-B. For example, the old Node-B manages to send PDUs 1-2 to the user equipment before the user equipment leaves the old Node-B. The user equipment then leaves the old Node-B and tunes to the radio channel of the new Node-B. The New Node-B will then continue to send all the PDUs 1-3, waiting in its buffer, that does not have a time-to-live timer that has expired. If none of the timers have expired the new Node-B will continue with the PDUs that it has in its buffer and send these to the user equipment. In this example it will send PDUs 1-3.

The problem is that since the user equipment already has received PDUs with SN5 and SN6, it will interpret receiving of PDU-SN5 again as an indication that it has lost all the PDUs with sequence number 7, 8, 9 . . . , up to max sequence number and the PDUs with the sequence numbers 0, 1, 2, 3, 4, i.e. that the user equipment is believing that the sequence number has been wrapped around and that the user equipment is now receiving the next cycle of sequence numbers. The rules in the RLC protocol says the user equipment shall interpret a received PDU being associated with the same or a lower sequence number as the previous received PDU, as a wrap around, i.e. that a new cycle of PDUs is received and that the intermediate PDUs has been lost. For RLC UM the sequence number is 7 bits so the maximum sequence number is 128.

Each PDU in a sequence cycle is associated with one and the same Hyper Frame Number (HFN) such that each PDU in a subsequent sequence cycle is associated with one and the same HFN that is increased compared with the previous sequence cycle. The HFN is the most significant bits (MSB) and the PDU sequence number is the least significant bits (LSB) of the sequence number used by the user equipment in the decipher algorithm to decipher received PDUs, if ciphering is used. A wrongly interpretation of a RLC sequence number wrap-around, as described in the scenario above, is interpreted as an increase of the HFN meaning that the user equipment will use erroneous input to the deciphering algorithm and can therefore not decipher the data correctly. This is a condition that would last for the rest of the connection, and would therefore be catastrophic for the service.

SUMMARY OF THE INVENTION

It is therefore an object of the present invention to provide an improved real-time application performance for user equipments.

According to a first aspect of the present invention, the object is achieved by a method for bi-casting real time data packets in a mobile system node. The node is comprised in a mobile system, which mobile system comprises an old Node-B and a new Node-B. The old Node-B and the new Node-B are adapted to be connected to the node. The mobile system further comprising a user equipment 130 adapted for switching the receipt of real time data packets from the old Node-B to the new Node-B. The method comprises the steps of associating a first sequence number with a first real time data packet adapted to be sent to the old Node-B, and associating a second sequence number with the same first real time data packet adapted to be sent to the new Node-B. The second sequence number is different from the first sequence number.

According to a second aspect of the present invention, the object is achieved by an arrangement in a mobile system node. The node is comprised in a mobile system. The mobile system comprises an old Node-B and a new Node-B, which old Node-B and new Node-B are adapted to be connected to the node. The mobile system further comprises a user equipment adapted for switching the receipt of real time data packets from the old Node-B to the new Node-B. The node arrangement comprises a bi-casting unit adapted to associate a first sequence number with a first real time data packet adapted to be sent to the old Node-B. The bi-casting unit is further adapted to associate a second sequence number with the same first real time data packet adapted to be sent to the new Node-B. The second sequence number being different from the first sequence number.

Since the sequence number associated with the real time data packet to be sent to the new Node-B is different from the sequence number associated with the same real time data packet to be sent to the old Node B, a misinterpreted turnaround can be avoided which provides an improved real-time application performance for user equipment.

An advantage of the present invention is that it allows using real-time application services, e.g. VoIP, on HS-DSCH.

A further advantage of the present invention is that it allows bi-casting in order to avoid loss of data during mobility from one Node-B to another Node-B.

A further advantage of the present invention is that it prevents erroneous input to the deciphering algorithm due to misinterpreted turn-around.

DETAILED DESCRIPTION OF PREFERRED EMBODIMENTS

The invention is defined as a method and an arrangement which may be put into practice in the embodiments described below.

Figure 1:
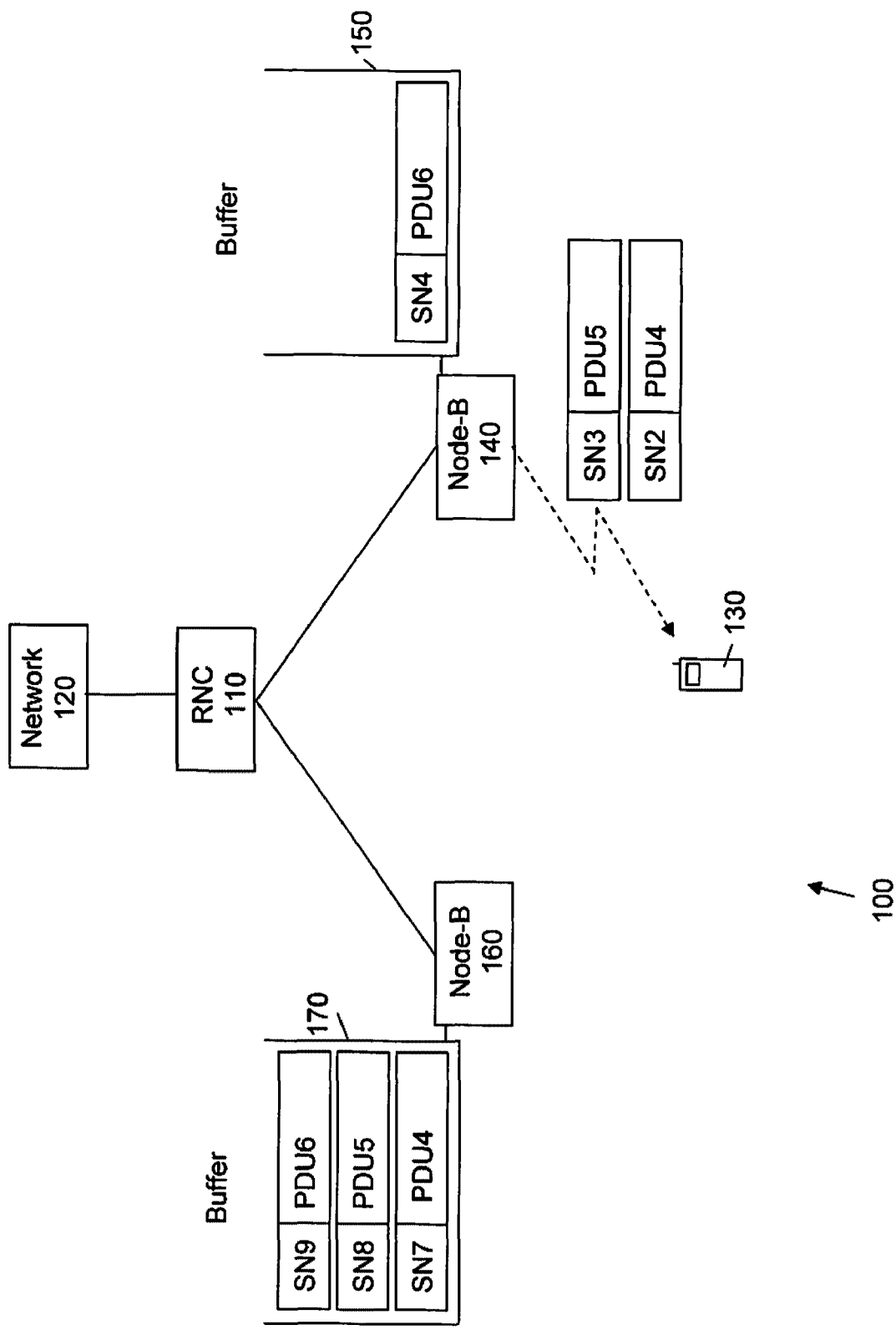
FIG. 1 is a schematic block diagram illustrating a mobile system.

FIG. 1 depicts an exemplary scenario of a cellular mobile system 100 comprising a mobile system node which in this example is a RNC 110. The mobile system is connectable to an infrastructure network 120 such as e.g. the Public Switched Telephone Network (PSTN), an IP network or a radio access network. The mobile system 100 uses technologies such as e.g. WCDMA, HS-DSCH, Enhanced Dedicated Channel (E-DCH), Enhanced Universal Mobile Telecommunications System Terrestrial Radio Access (E-UTRA), 3G Long Term Evolution (3GLTE), Super 3G or Wireless World Initiative New Radio (WINNER). A user equipment 130 is located under radio coverage of the mobile system 100 and is connected to the infrastructure network 120, via a radio channel to a first base station, which in this example is a Node-B 140. The Node-B 140 is denoted the old Node-B 140, which old Node-B is associated with a cell, in which cell the user equipment 130 currently is positioned. The user equipment 130 may be personal digital assistants (PDA), laptop computers or any type of devices capable of communicating via radio resources. The user equipment 130 is receiving real time data packets, so-called, PDUs that are being transferred to the user equipment 130 in a stream from the infrastructure network 120. The PDUs are transmitted via the RNC 110 and via the old Node-B 140 before sending them on to the user equipment 130. In this embodiment RLC UM is used for a real time service (unacknowledged mode segmentation/concatenation protocol that includes a sequence number) but any similar protocol may also be used.

The real time data packets are encapsulated and sequence numbers are added. I.e. according to the embodiment in FIG. 1, the application PDUs are encapsulated in RLC UM PDUs using segmentation/concatenation and addition of a sequence number. This is performed by e.g. the RNC 110 such that a first RLC PDU4 is associated with a sequence number SN2, a second RLC PDU5 is associated with a sequence number SN3, and a third RLC PDU6 is associated with a sequence number SN4.

The above mentioned encapsulated PDUs, PDU4 associated with SN2, PDU5 associated with SN3 and PDU6 associated with SN4, are sent from the RNC 110 to the old Node-B. The old Node-B comprises a buffer 150 wherein the PDUs associated with the respective sequence numbers, are temporary stored while waiting to be scheduled.

However, the user equipment 130 is moving towards a second cell in the mobile system 100, which second cell is associated with a second base station such as e.g. a Node-B, in this example denoted new Node-B 160. This means that when the user equipment 130 enters the second cell, it will switch on to continue the receipt of the real time data packets from new Node-B when the user equipment 130 is informed by the RNC 110 to start reception from the new Node-B 160 instead of the old Node-B 140.

Since the RLC sequence numbers need to arrive in sequence (to avoid interpreting a RLC SN wrap around), the RNC 110 can anticipate for the potential uncertainty in the time related to the PDUs when the user equipment 130 is switching from the old Node-B 140 to the new Node-B160. The RNC 110 estimates that the change will occur in the time span of when PDU4 and PDU6 is to be transmitted to the user equipment 130 and therefore starts bi-casting by sending PDU4, PDU5 and PDU6 to both the old Node-B 140 and the new Node-B 160.

According to the present invention, when bi-casting, the RNC 110 tampers with the PDU data before transmitting it to the new Node-B 160 so that the data sent to new Node-B 160 differs from the data that is sent to the old Node-B 140. This is to avoid that the user equipment 130 wrongly interprets that the sequence number has been wrapped around, i.e. that the user equipment when switching from old Node-B 140 to new Node-B 160 deludes into believing that it receives the next cycle of sequence numbers when that is not the real case. The tampering with the PDU data before transmitting it to the new Node-B may be performed by a function in a mobile system node such as e.g. the RNC 110 that introduces a RLC SN slip of N between the data sent to the old Node-B 140 and the New-Node-B 160. As illustrated in FIG. 1, the sequence numbers sent to the old Node-B 140 are increased with one for each new PDU sent to the old Node-B 140. At the same time during the phase when bi-casting is used, the same PDU is sent to the new Node-B but with an extra increase in the sequence number with N. In the embodiment in FIG. 1, this is performed such that PDU4 is associated with sequence number SN2 and is sent to old Node-B 140 but PDU4 is instead associated with a different sequence number SN7 when sent to new Node-B 160, i.e. the sequence number is increased with 5 when sent to the new Node B. In the same way PDU5 is associated with sequence number SN3 and is sent to old Node-B 140 but PDU5 is associated with a different sequence number SN8 when sent to new Node-B 160, i.e. the sequence number is also increased with 5 when sent to the new Node B, and PDU6 is associated with sequence number SN4 and is sent to old Node-B 140 but PDU6 is associated with a different sequence number SN9 when sent to new Node-B 160, i.e. the sequence number is also increased with 5 when sent to the new Node B. It of less importance how much the sequence numbers are increased compared to the sequence numbers associated with the PDUs sent to the old Node-B 140, typically the sequence number difference between the one sent to old Node-B 140 and to new Node-B 160, "N" should be related to the time-to-live timer in the Node-Bs 140 and 160, i.e. if the time-to-live for a PDU sent to the new Node-B 160 is T and one PDU is sent every time period t the sequence number should be larger than (T DIV t). (DIV in (T DIV t) is division that results in the integer part such as e.g. 10 div 3=3, 9 div 3=3, 5 div 3=1 etc.)

However, what is important is that the increase of the sequence number must be greater than the smallest of the two following alternatives:

the anticipated number of packets that are needed to be send to the old Node-B 140 before the switch, i.e. the predetermined time to make the switch divided by the intensity of packets, and the number of packets that can be send to the old Node-B 140 during the time to live, i.e. the time to live divided by the intensity of packets.

E.g. assume that the switching time is 200 ms and the time to live is 100 ms, and the intensity of packets is 20 ms, then the anticipated number of packets needed to be send to the old Node-B 140 before the switch is 200/20=10 and the number of packets that are send during the time to live is 100/20=5. Thus the increase needs to be larger than 5 in order not to run into problems.

The sequence number can be described as k in the old Node-B 140 and as k+N in the new Node-B, where N is the extra increase in the sequence number.

This means consequently that the RNC 110 then sends PDU4 associated with SN9, PDU5 associated with SN10, and PDU6 associated with SN11 to the new Node-B 160. The new Node-B 160 also comprises a buffer 170 wherein the PDUs 2-4 associated with the respective differentiated sequence numbers SN9-11 are temporary stored while waiting to be scheduled.

As can be seen from the scenario in FIG. 1, the user equipment 130 receives PDU4 associated with SN2, and PDU5 associated with SN3 from the old Node-B 140 before switching on to receive from new Node-B 140. When switching to receive from new Node-B 160, new Node-B will start sending the stored PDUs 2-4 associated with the respective differentiated sequence numbers SN7-9 stored in the buffer 170.

The user equipment 130 will, as mentioned above, receive PDUs 4-5 associated with respective sequence numbers SN2 and SN3 from the old Node-B 140 and then when switched, the user equipment 130 will receive again the same PDUs 4-5 but instead associated with respective sequence numbers SN7 and SN8. The sequence number series was broken, which break is the jump from SN3 to SN7, but since the break did not involve the same or a decreased sequence number, the user equipment 130 will not interpret this as a RLC SN wrap around, i.e. that the next cycle of sequence numbers sequence of PDUs. PDU 4 and PDU5 are duplicated, however, there is, e.g. in case of VoIP, a protocol on top of the RLC in the user equipment, like Real time Transport Protocol (RTP), that includes sequence numbers; said protocol being able to detect duplicates and remove them before they are passed on to the application in the user equipment 130.

Figure 2:
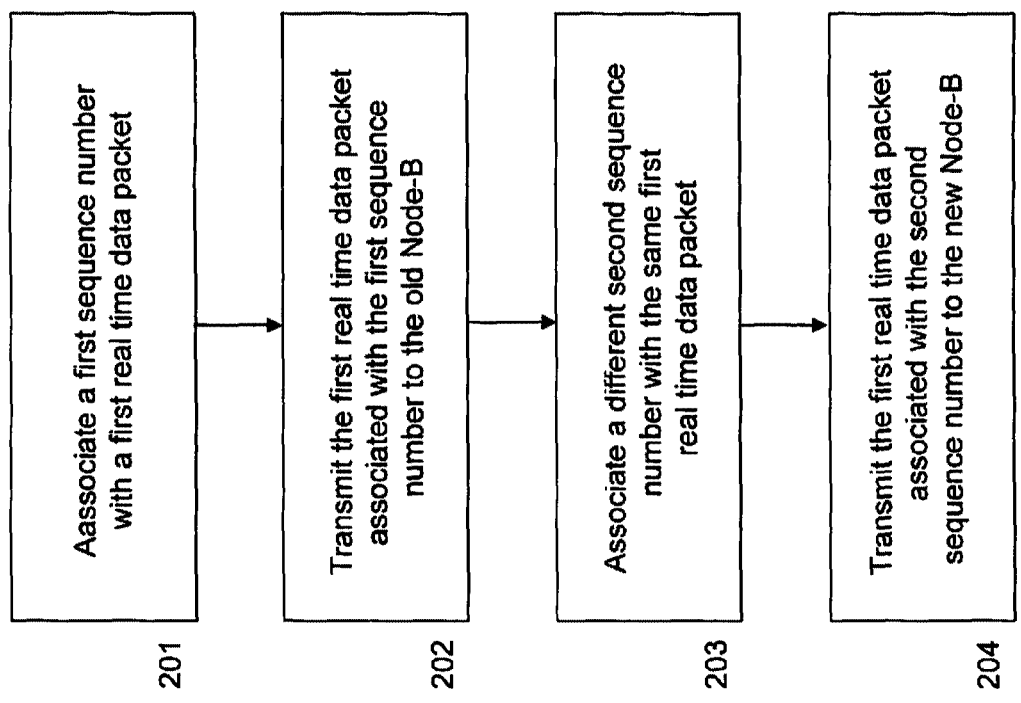
FIG. 2 is a flow chart illustrating a method in a mobile system node.

The present method steps performed by the mobile system node 110 will now be described with reference to a flow chart depicted in FIG. 2.

201. The node 110 associates a first sequence number SN2, SN3, SN4 with a first real time data packet PDU4, PDU5, PDU6.

202. The node 110 transmits the first real time data packet PDU4, PDU5, PDU6 associated with the first sequence number SN2, SN3, SN4 to the old Node-B 140.

203. The node 110 associates a second sequence number SN7,SN8,SN9 with the same first real time data packet PDU4, PDU5, PDU6, the second sequence number being different from the first sequence number.

204. The node 110 then transmits to the new Node-B, the same first real time data packet PDU4, PDU5, PDU6 as transmitted to the old Node-B 140, but associated with the second sequence number SN7, SN8, SN9.

Figure 3:
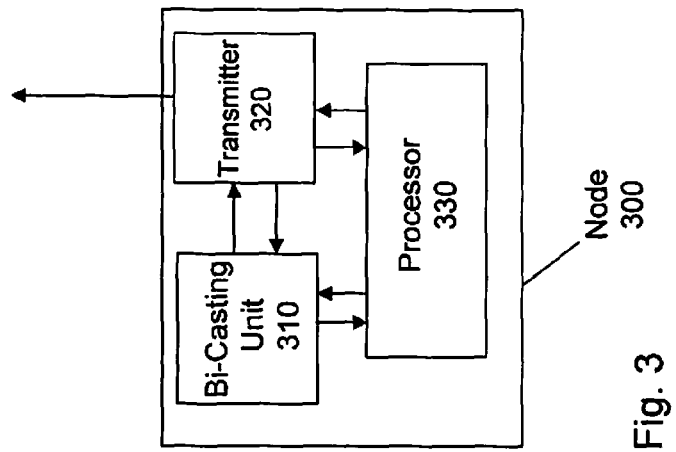
FIG. 3 is a schematic block diagram illustrating an arrangement in a mobile system node.

To perform the present method steps, the mobile system node 110 comprises an arrangement 300 as depicted in FIG. 3. The node arrangement 300 comprises a bi-casting unit 310 adapted to associate a first sequence number SN2, SN3, SN4 with a first real time data packet PDU4, PDU5, PDU6 adapted to be sent to the old Node-B 140. The bi-casting unit 310 is further adapted to associate a second sequence number SN7, SN8, SN9 with the same first real time data packet PDU4, PDU5, PDU6 adapted to be sent to the new Node-B 160. The second sequence number is different from the first sequence number. The node arrangement 300 further comprises a transmitter 320 adapted to transmit the first real time data packet PDU4, PDU5, PDU6 associated with the first sequence number SN2,SN3,SN4 to the old Node-B 140. The transmitter is further adapted to transmit the same first real time data packet PDU4, PDU5, PDU6 but associated with the second sequence number SN7, SN8, SN9 to the new Node-B 160.

The present bi-casting mechanism can be implemented through one or more processors, such as the processor 330 in the mobile system node arrangement 300 depicted in FIG. 3, together with computer program code for performing the functions of the invention. The program code mentioned above may also be provided as a computer program product, for instance in the form of a data carrier carrying computer program code for performing the present method when being loaded into the mobile system node. One such carrier may be in the form of a CD ROM disc. It is however feasible with other data carriers such as a memory stick. The computer program code can furthermore be provided as pure program code on a server and downloaded to the mobile system node remotely.

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. A method for bi-casting real time data packets in a mobile system comprising an old Node-B and a new Node-B, wherein said old Node-B and said new Node-B are configured to be connected to a user equipment configured to switch the receipt of real time data packets from the old Node-B to the new Node-B, the method comprising the steps of:
    associating a first sequence number with a first real time data packet configured to be sent to a mobile terminal via the old Node-B; and
    associating a second sequence number with the same first real time data packet configured to be sent to the mobile terminal via the new Node-B, the second sequence number being different from the first sequence number, such that the mobile terminal will receive two copies of the first real time data packet having different sequence numbers from one another.

2. The method according to claim 1, wherein the second sequence number is different such that it is an increase of the first sequence number.

3. The method according to claim 2, comprising the further steps of:
    transmitting the first real time data packet associated with the first sequence number to the old Node-B; and
    transmitting the same first real time data packet but associated with the second sequence number to the new Node-B.

4. The method according to claim 2, wherein a number of real time data packets are transmitted, wherein the real time data packets have a predetermined time-to-live, one real time data packet is sent every time period (t), and wherein the increase of the second sequence number is larger than an integer portion of a quotient of T divided by t.

5. The method according to claim 2, wherein the increase of the second sequence number is greater than the smallest of the two following alternatives:
    the anticipated number of real time data packets that are needed to be sent to the old Node-B before the switch, and
    the number of real time data packets that can be sent to the old Node-B during a predetermined time to live.

6. The method according to claim 1, wherein the node is a radio network controller (RNC).

7. An arrangement in a mobile system, the mobile system comprising an old Node-B and a new Node-B, wherein said old Node-B and said new Node-B are configured to be connected to a user equipment configured for switching the receipt of real time data packets from the old Node-B to the new Node-B, the arrangement comprising:
    a bi-casting unit configured to associate a first sequence number with a first real time data packet configured to be sent to a mobile terminal via the old Node-B, the bi-casting unit further configured to associate a second sequence number with the same first real time data packet configured to be sent to the mobile terminal via the new Node-B, wherein the second sequence number is different from the first sequence number, such that the mobile terminal will receive two copies of the first real time data packet having different sequence numbers from one another.

8. The arrangement according to claim 7, further comprising a transmitter configured to transmit the first real time data packet associated with the first sequence number to the old Node-B and to transmit the same first real time data packet but associated with the second sequence number to the new Node-B.

* * * * *